United States Patent
Midorikawa et al.

[11] Patent Number: 5,851,321
[45] Date of Patent: Dec. 22, 1998

[54] PNEUMATIC TIRE INCLUDING CAP TREAD PORTION

[75] Inventors: Shingo Midorikawa; Kinya Kawakami; Eri Miura, all of Hiratsuka, Japan

[73] Assignee: The Yokohama Rubber Co., Ltd., Tokyo, Japan

[21] Appl. No.: 584,419

[22] Filed: Jan. 11, 1996

[30] Foreign Application Priority Data

Jan. 13, 1995 [JP] Japan ................................. 7-004244

[51] Int. Cl.⁶ .............................. B60C 1/00; B60C 11/00
[52] U.S. Cl. ........................................ 152/209 R; 524/492
[58] Field of Search ........................... 152/209 R, 209 D; 524/492, 493

[56] References Cited

U.S. PATENT DOCUMENTS

| | | | |
|---|---|---|---|
| 3,768,537 | 10/1973 | Hess et al. | 152/209 R |
| 4,519,430 | 5/1985 | Ahmad et al. | 152/209 R |
| 4,619,300 | 10/1986 | Tokunaga et al. | 152/209 R |
| 5,066,702 | 11/1991 | Hayashi et al. | 152/209 R |
| 5,066,721 | 11/1991 | Hamada et al. | 525/102 |
| 5,225,011 | 7/1993 | Takino et al. | 152/209 R |
| 5,336,730 | 8/1994 | Sandstrom et al. | 152/209 R |
| 5,393,821 | 2/1995 | Shieh et al. | 524/492 |
| 5,591,279 | 1/1997 | Midorikawa et al. | 152/209 R |

FOREIGN PATENT DOCUMENTS

| | | | |
|---|---|---|---|
| 65406 | of 0000 | Japan | 152/209 R |
| 55-135149 A | 10/1980 | Japan . | |
| 58-199203 A | 11/1983 | Japan . | |
| 60-137945 A | 7/1985 | Japan . | |
| 61-215638 A | 9/1986 | Japan . | |
| 61-218404 A | 9/1986 | Japan . | |
| 61-287802 A | 12/1986 | Japan . | |
| 64-22940 A | 1/1989 | Japan . | |
| 1-101344 A | 4/1989 | Japan . | |
| 1-164602 A | 6/1989 | Japan . | |
| 182332 | 7/1989 | Japan | 152/209 R |
| 1-315439 A | 12/1989 | Japan . | |
| 167353 | 6/1990 | Japan | 152/209 R |
| 76602 | 1/1991 | Japan | 152/209 R |
| 3-84049 A | 4/1991 | Japan . | |
| 3-252431 A | 11/1991 | Japan . | |
| 5-51485 A | 3/1993 | Japan . | |
| 5-271477 A | 10/1993 | Japan . | |
| 5-331316 A | 12/1993 | Japan . | |
| 40216 | 2/1994 | Japan | 152/209 R |
| 240052 | 8/1994 | Japan | 152/209 R |

*Primary Examiner*—Steven D. Maki
*Attorney, Agent, or Firm*—Finnegan, Henderson, Farabow, Garrett & Dunner, L.L.P.

[57] ABSTRACT

A pneumatic tire in which the cap tread portion is composed of a rubber composition comprising (i) 100 parts by weight of a diene rubber having a glass transition temperature (Tg) of not more than −45° C. and (ii) not more than 65 parts by weight of carbon black having a nitrogen specific surface area ($N_2SA$) of not less than 140 $m^2/g$, a DBP oil absorption of not less than 120 ml/100 g, a ΔDBP of not less than 30 ml/100 g, and a half value (ΔDst) of distribution of aggregates, measured by a centrifugal precipitation method, of not more than 50 m$\mu$, or a pneumatic tire in which a cap tread portion is composed of a rubber composition comprising (A) 100 parts by weight of a rubber component mainly comprising natural rubber and polybutadiene rubber and having a hardness at 0° C. of not more than 60 and (B) (i) carbon black having a nitrogen specific surface area ($N_2SA$) of not less than 120 $m^2/g$ and a 24M4DBP of not less than 90 ml/100 g and (ii) a silica in an amount of 5 to 40 parts by weight, with the total weight of the carbon black and silica being not more than 60 parts by weight.

6 Claims, No Drawings

PNEUMATIC TIRE INCLUDING CAP TREAD PORTION

BACKGROUND OF THE INVENTION

1. Field of the Invention

The present invention relates to a pneumatic tire. More particularly, it relates to a pneumatic tire, particularly a studless tire, with a cap tread portion comprising a specific rubber composition, whereby the wear resistance, aging resistance, etc. are improved, while maintaining the ice and snow performance.

2. Description of the Related Art

The tread portion of a pneumatic tire is generally constituted by an outer layer of a cap tread and an inner layer of an undertread portion. This pneumatic tire is required to exhibit various types of performances. In particular, it is required to exhibit wear resistance, aging resistance, and other performances, while maintaining the winter ice and snow performance thereof. Several proposals have been made from this viewpoint. For example, Japanese Unexamined Patent Publication (Kokai) No. 55-135149, Japanese Unexamined Patent Publication (Kokai) No. 58-199203, and Japanese Unexamined Patent Publication (Kokai) No. 60-137945 propose to blend a large amount of a softener into the tread rubber to lower the hardness at low temperatures and improve the performance on ice, but in this case there is the problem that the wear resistance and the aging resistance are not sufficient. Further, while for a different object, as a proposal for using a special carbon black, Japanese Unexamined Patent Publication (Kokai) No. 1-164602 proposes to use for a tire tread a composition comprising 100 parts by weight of rubber and 50 to 150 parts by weight of carbon black having a nitrogen specific surface area ($N_2SA$) of 140 to 160 $m^2/g$, a DBP oil absorption of not less than 120 ml/100 g, a $\Delta$DBP of not less than 30 ml100 g, and a 66 Dst of not more than 50 m$\mu$, so as to improve the steering stability. However, this formulation suffers from the problem of insufficient ice and snow performance and aging resistance. Further, Japanese Unexamined Patent Publication (Kokai) No. 1-315439 proposes to formulate 100 parts by weight of SBR and other diene type rubbers with 50 to 200 parts by weight of carbon black having an $N_2SA$ of 140 to 160 $m^2/g$, a DBP oil absorption of not less than 120 ml/100 g, and a $\Delta$DBP of not less than 30 ml/100 g. However, this formulation also suffered from the problem of an inability to achieve ice and snow performance and aging resistance simultaneously.

Furthermore, Japanese Unexamined Patent Publication (Kokai) No. 5-331316 proposes the use of a composition comprising 80 to 180 parts by weight, in total, of silica and carbon black having an $N_2SA$ of not less than 80 $m^2/g$ and 100 parts by weight of rubber containing SBR having a bound styrene of 25 to 60% so as to improve the wet performance when driving at high speeds. However, this formulation suffered from the problem of an inferior ice and snow performance and aging. Further, Japanese Unexamined Patent Publication (Kokai) No. 5-51485, Japanese Unexamined Patent Publication (Kokai) No. 3-84049, Japanese Unexamined Patent Publication (Kokai) No. 61-287802, etc. propose the blending of carbon black and silica into a diene rubber such as natural rubber or SBR. However, these formulations again suffered from the problem of an insufficient ice and snow performance.

Further, Japanese Unexamined Patent Publication (Kokai) No. 1-101344, Japanese Unexamined Patent Publication (Kokai) No. 64-22940, etc. disclose compositions obtained by blending silica (and carbon black) with amino group-containing SBR. However, these formulations suffered from the problem of inferior low temperature properties. Japanese Unexamined Patent Publication (Kokai) No. 3-252431 and Japanese Unexamined Patent Publication (Kokai) No. 61-218404 disclose the blending of silica, carbon black, and silane in SBR (and natural rubber). However, these formulations suffer from the problem of inferior ice and snow performance and wear resistance. Japanese Unexamined Patent Publication (Kokai) No. 61-215638 and Japanese Unexamined Patent Publication (Kokai) No. 5-271477 disclose the blending of silica (and HAF carbon) into SBR or natural rubber. However, it was not possible to achieve both wear resistance and wet performance simultaneously. As explained above, in the prior art, there has never been proposed a formulation satisfying all of the ice and snow performance, wear resistance, wet performance, and aging. Further, conventional tires have included large amounts of softeners so as to ensure pliability and wear resistance of the cap tread portion at low temperatures. During driving or with aging, however, the softener in the cap tread portion migrates to the inner layers of the tire, such as the undertread portion, or disperses to the road surface or in the atmosphere, causing changes in the hardness of the tire (rise in same). Accordingly, there was the problem of a gradual deterioration of the performance on ice.

When only the softener is reduced as a countermeasure, the hardness of the tire is increased and the performance on ice is declined. When the amount of carbon etc. was reduced as well to adjust the hardness, the tan$\delta$ would fall and there would be the problem of a decline in the driving performance on general roads.

SUMMARY OF THE INVENTION

Accordingly, the objects of the present invention are to eliminate the above-mentioned disadvantageous of the conventional pneumatic tire and to provide a pneumatic tire having an excellent wear resistance, aging resistance, etc., while maintaining a superior ice and snow performance.

Other objects and advantages of the present invention will be apparent from the following description.

In accordance with the present invention, there is provided a pneumatic tire, in which the cap tread portion is composed of a rubber composition comprising (i) 100 parts by weight of a diene rubber having a glass transition temperature (Tg) of not more than $-450°$ C. and (ii) not more than 65 parts by weight of carbon black having a nitrogen specific surface area ($N_2SA$) of not less than 140 $m^2/g$, a DBP oil absorption of not less than 120 ml/100 g, a $\Delta$DBP of not less than 30 ml/100 g, and a half value ($\Delta$Dst) of distribution of aggregates, measured by a centrifugal precipitation method, of not more than 50 m$\mu$.

In accordance with the present invention, there is also provided a pneumatic tire in which a cap tread portion is composed of a rubber composition comprising (A) 100 parts by weight of a rubber component mainly comprising natural rubber and polybutadiene rubber and having a hardness at 0° C. of not more than 60 and (B) (i) carbon black having a nitrogen specific surface area ($N_2SA$) of not less than 120 $m^2/g$ and a 24M4DBP of not less than 90 ml/100 g and (ii) a silica in an amount of 5 to 40 parts by weight, with the total weight of the carbon black and silica being not more than 60 parts by weight.

DESCRIPTION OF THE PREFERRED EMBODIMENTS

The present invention will now be explained in further detail.

The pneumatic tire according to the present invention is not particularly limited to the construction thereof and may be made a pneumatic tire of any construction known in the past, and also various constructions of pneumatic tires currently under development. In this way, the present invention includes all pneumatic tires having a cap tread portion constituted from a rubber composition having the above composition.

The rubber component constituting the cap tread portion of the pneumatic tire according to the first aspect of the present invention comprises a specific carbon black and a diene rubber having a glass transition temperature (Tg) of not more than $-45°$ C., preferably not more than $-50°$ C., particularly $-50°$ C. to $-150°$ C.

The diene rubber to be blended as the first component into the rubber composition constituting the cap tread portion of the pneumatic tire according to the first aspect of the present invention can be made any rubber generally used as rubber for a tire tread in the past so long as the Tg is not more than $-45°$ C. Examples of such a rubber are natural rubber (NR), polybutadiene rubber (BR), various styrene-butadiene copolymer rubbers (SBR), polyisoprene rubber (IR), etc. These rubbers can be used alone or as blends of any proportions. If the Tg of the diene rubber is higher than $-45°$ C., the wear resistance and the low temperature properties of the resultant tire become inferior.

The rubber composition constituting the cap tread portion of the pneumatic tire of the present invention further includes, as an essential component, the above-mentioned specific carbon black. The carbon black used for the rubber composition according to the first aspect of the present invention is a so-called "SAF carbon black" having a nitrogen specific surface area ($N_2SA$) of at least 140 $M^2/g$, preferably 140 to 160 $m^2/g$, a DBP (i.e., dibutyl phthalate) oil absorption of at least 120 ml/100 g, preferably 120 to 150 ml/100 g, a $\Delta$DBP (i.e., DBP oil absorption—24M4DBP oil absorption) of at least 30 ml/100 g, preferably 30 to 50 ml/100 g, and a $\Delta$Dst (half value of aggregate distribution, measured by a centrifugal precipitation method, of not more than 50 m$\mu$, preferably 30 to 50 m$\mu$.

According to the first aspect of the present invention, the above-mentioned carbon black is blended in an amount of not more than 65 phr (i.e., part per hundred rubber), preferably 30 to 65 phr. By using a rubber composition in which such a carbon black has been blended into such a diene rubber as the cap tread portion, it is possible to obtain a pneumatic tire having the improved wear resistance and aging resistance, while maintaining the so-called ice and snow performance.

Note that it is also possible to replace part of the above amount with another carbon black or silica etc.

The rubber composition constituting the cap tread portion of a pneumatic tire according to the first aspect of the present invention may contain a softener for the purpose of softening the formulation, in addition to the above essential components. Examples of such a softener are those which are known as ordinary rubber softeners such as petroleum type softening agents including paraffin type process oil, naphthene type process oil, and aromatic process oil, coal tar type softeners, aliphatic group type softeners, and ester type synthetic plasticizers, ether type synthetic plasticizers, etc.

The softener is blended in an amount of preferably not more than 70 parts by weight based upon 100 parts by weight of the total of the reinforcing agents (e.g., carbon black and silica), more preferably 5 to 50 parts by weight from the viewpoint of the aging resistance and wear resistance. If the amount of the softener is too large, the aging resistance becomes inferior, and therefore, this is not preferred.

The rubber composition according to the first aspect of the present invention may contain, instead of the above-mentioned softener or in place of part of the above-mentioned softener, a low molecular weight liquid polymer having a weight average molecular weight of not more than 60,000, preferably 6,000 to 60,000, particularly, a low molecular weight diene liquid polymer. When blending this liquid polymer, the aging resistance is further improved, because the migration in the rubber is smaller than that of the above softener.

The rubber component constituting the cap tread portion of the pneumatic tire according to the second aspect of the present invention, as mentioned above, mainly comprises natural rubber (NR) and polybutadiene rubber (BR). Preferably, the total amount of the NR and BR is at least 80% by weight of the total weight of the rubber, more preferably at least 90% by weight. In addition, SBR, IR, EPDM, etc. may be blended thereinto. The rubber blended in the present invention has a hardness (Hs) at $0°$ C. (based on JIS-K-6301) of not more than 60, preferably 50 to 60. If the Hs ($0°$ C.) is more than 60, the ice and snow performance becomes inferior, while conversely, if the Hs ($0°$ C.) is too low, the wear resistance is liable to fall. The preferable ratio of blending (by weight) of the NR and BR is 80/20 to 50/50. If the proportion of the NR is too large, there is a tendency for the strength and low temperature properties to become inferior, while if the proportion of the BR is too large, there is a tendency for the durability to become inferior.

The rubber composition constituting the cap tread portion of the pneumatic tire according to the second aspect of the present invention contains as essential components the previously mentioned specific carbon black and silica.

The carbon black usable in the rubber composition according to the second aspect of the present invention has an $N_2SA$ of at least 120 $m^2/g$, preferably 120 to 200 $m^2/g$, and a 24M4DBP oil absorption of at least 90 ml/100 g, preferably 90 to 130 ml/100 g. With a carbon black having an $N_2SA$ of less than 120 $m^2/g$ or a 24M4DBP of less than 90 ml/100 g, the wear resistance and the wet performance cannot be improved.

The silica usable in the rubber composition according to the second aspect of the present invention may be any silica (or white carbon) which can be used in a rubber formulation and is blended in an amount of 5 to 40 parts by weight, preferably 10 to 30 parts by weight, based upon 100 parts by weight of rubber. A preferable silica has an $N_2SA$ of 100 to 400 $m^2/g$. If the amount of the silica is less than 5 parts by weight, the wet performance declines.

The amount of the carbon and silica blended in the rubber composition according to the second aspect of the present invention must be not more than a total of 60 parts by weight per 100 parts by weight of rubber, preferably 35 to 60 parts by weight, more preferably 45 to 60 parts by weight. If the total is more than 60 phr, the hardness Hs of the rubber is increased and the performance on ice is decreased. If the amount of the softener is increased to adjust the hardness Hs, the aging becomes inferior. Conversely, if too small, the effect of improvement in the wet performance and wear resistance is descreased.

The rubber composition according to the second aspect of the present invention may contain a softener for the purpose of softening the formulation. Examples of such a softener are those which are known as ordinary rubber softeners such as petroleum type softeners like paraffin type process oil, naphthene type process oil, and aromatic process oil, coal tar type softeners, aliphatic group type softeners, and ester type synthetic plasticizers, ether type synthetic plasticizers, etc., as mentioned above. The softener is blended in an amount of preferably not more than 70 parts by weight based upon 100 parts by weight of the total of the carbon black and silica, more preferably 5 to 50 parts by weight from the viewpoint of the aging and wear resistance. If the amount of the softener is too large, the aging becomes inferior, and therefore, this is not preferred.

The rubber composition according to the second aspect of the present invention may contain, instead of the above-mentioned softener or in place of part of the above softener, a low molecular weight liquid polymer having a molecular weight of not more than 60,000, preferably 6,000 to 60,000, particularly, a low molecular weight diene type liquid polymer. When blending this liquid polymer, since the migration is smaller than that of the above softener, the aging can be further improved.

The rubber composition according to the second aspect of the present invention further, preferably, may contain a silane coupling agent in an amount of 5 to 20% by weight of the amount of the silica so as to strengthen the bonds between the rubber and silica. Examples of such a silane coupling agent are bis-(3-triethoxysilylpropyl)tetrasulfide, 3-trimethoxysilylpropylbenzothiazoletetrasulfide, γ-glycideoxypropyl-trimethoxysilane, γ-mercaptopropyl-trimethoxysilane, etc.

The rubber composition according to the second aspect of the present invention preferably also uses an activating agent in an amount of 1 to 15% by weight of the amount of the silica, for example, to prevent adsorption of the vulcanization accelerator at the surface OH groups of the silica and prevent the delay of the vulcanization and also to assist the dispersion of the silica. Examples of such an activating agent are glycols such as ethylene glycol, diethylene glycol, and triethylene glycol.

The rubber composition according to the second aspect of the present invention preferably has a tanδ (0° C.) of at least 0.2, particularly preferably 0.2 to 0.6. If the value of the tanδ (0° C.) is less than 0.2, the grip performance tends to decline, while conversely if more than 0.6, the low temperature properties tend to become inferior.

The tire use rubber composition according to the first and second aspect of the present invention may contain, in addition to the above-mentioned required components, various additives generally blended in for tire use, such as sulfur, a vulcanization accelerator, an antioxidant, filler, softener, and plasticizer. The formulation may be vulcanized and made into a tire tread by general methods. The amounts of these additives can also be made the generally used amounts. For example, it is preferable to make the amount of the sulfur at least 0.5 part by weight based upon 100 parts by weight of the rubber, particularly preferably 0.8 to 2.0 parts by weight.

EXAMPLES

The present invention will now be further illustrated by, but is by no means limited to, the following Examples.

Examples I-1 to I-5 and Comparative Examples I-1 to I-9

The components shown in Table I-1 were blended in the amounts shown (parts by weight). The starting rubber and blending agents, except for the vulcanization accelerator and sulfur, were mixed in a 1.7 liter Banbury mixer for 5 minutes, then the vulcanization accelerator and sulfur were kneaded into the mixture by an 8-inch test kneading roll for 4 minutes to obtain the rubber compositions. The rubber compositions thus obtained were pressed at 160° C. for 15 minutes for vulcanization, the necessary test pieces were prepared, the tests run, and the physical properties measured. The physical properties of the resultant vulcanizates were as shown in Table 1-1. For the dry steering stability, the formulations thus obtained were measured as to their braking performance on ice and wear resistance under the latter explained conditions by a test vehicle (Japanese FF sedan) equipped with pneumatic radial studless tires of a general structure (size: 185/70R13). The results are shown in Table I-1.

The blending agents used in the formulations of the Examples and Comparative Examples of Table I-1 were as follows:

NR: SIR-20 (Tg: −71° C.)

BR: Nippon Zeon "Nipol 1220" (Tg=−106° C.)

SBR: Nippon Zeon "Nipol 9520" (SBR of styrene content=38%, vinyl content=14%, Tg of −32° C., 37.5 phr oil absorption)

| Carbon black | NSA ($m^2$/g) | DBP (ml/100 g) | ΔDBP (ml/100 g) | Dst (mμ) |
|---|---|---|---|---|
| I-1 | 142 | 132 | 31 | 48 |
| I-2 | 155 | 136 | 38 | 41 |
| I-3 | 145 | 129 | 26 | 49 |
| I-4 | 153 | 133 | 33 | 53 |
| I-5 | 145 | 116 | 17 | 76 |
| I-6 | 111 | 111 | 14 | 61 |
| I-7 | 92 | 117 | 16 | 70 |

(Notes) Methods of Measurement of Properties of Carbon Black (a) Nitrogen Specific Surface Area ($N_2$SA) According to ASTM-D3037-78 "Standard Methods of Treating Carbon Black—Surface Area by Nitrogen Adsorption" Method C.

(b) Dibutyl Phthalate Oil Absorption (DBP Oil Absorption)

According to JIS K6221 "Testing Methods for Rubber Use Carbon Black" 6.1.2(1) Method A.

(c) 24M4DBP Oil Absorption According to ASTM-D3493.

(d) 66 DBP DBP oil absorption—24M4DBP oil absorption.

(e) Half-Value of Distribution of Aggregates (ΔDst) Measured by the following method using a disk centrifuge (made by Joice Loebl of U.K.)

That is, carbon black was precision weighed. A 20% by volume aqueous solution of ethanol and surfactant were added and the carbon black made to disperse by ultrasonic waves to give a concentration of 5 mg/100 cc and prepare a sample solution. The speed of the disk centrifuge was set to 8000 rpm, 10 ml of a spin solution (distilled water) was added to the disk centrifuge, then 0.5 ml of a buffer solution (20% by volume aqueous solution of ethanol) was poured in. Next, 0.5 to 1.0 ml of the sample solution was added by a syringe, the centrifugal precipitation was started, then an aggregate distribution curve was prepared by conversion by the Stokes diameter by the optical precipitation method. The distribution of the aggregates at ½ of the maximum frequency (maximum absorbance) in the histogram was used as the half value (ΔDst).

Liquid polymer: Liquid polybutadiene (molecular weight 15,000, 1,4-cis 80%)

Aromatic oil: Kyodo Sekiyu "Process Oil X-140"

Zinc white: Seido Chemical Industry "Zinc White No. 3"

Stearic acid: Kao Corporation "Lunac YA"

Antioxidant: N-phenyl-N'-(1,3-dimethyl)-p-phenylenediamine (Sumitomo Chemical "Antigen 6C")

Wax: Ouchi Shinko Chemical Industrial "Sunnoc"

Sulfur: Oil treated sulfur

Vulcanization accelerator: N-tert-butyl-2-benzothiazoyl-sulfeneamide (Ouchi Shinko Chemical Industrial "Nocceler NS-F")

The testing methods for evaluation of the performance of the formulations shown in Table I-1 were as follows:

(1) Hardness Hs (0° C.)

The hardness at a temperature of 0° C. was measured in accordance with JIS K 6301.

(2) ICE and WET Skid

A British portable skid tester was used to measure the skid under conditions of an ice-covered road surface (temperature −5° C.) and a wet road surface (temperature 20° C.). The results were indicated indexed to Comparative Example I-1 as 100. The larger the value, the better the skid resistance.

(3) Lambourn Abrasion

A Lambourn abrasion tester (manufactured by Iwamoto Seisakusho) was used to measure the loss of weight due to wear under conditions of a temperature of 200° C. and a slippage of 50%. The results were indicated indexed to Comparative Example I-1 as 100. The larger the value, the better the abrasion resistance.

(4) Hs Aging

An air heating aging test (70° C., 168 hours) was conducted in accordance with JIS K 6301, then the hardness at a temperature of 0° C. was measured and the amount of change from the hardness before aging was found. The results were indicated indexed to Comparative Example I-1 as 100. The larger the value, the smaller the change in hardness and the better the aging resistance.

(5) Braking on Ice (New and Driven)

Tires which were new (not yet driven on) and which had been driven on for 10,000 km were run at 30 km/h on ice sheets and then braked to measure the braking distance. The results were indicated indexed to Comparative Example I-1 as 100. The larger the value, the better the braking.

(6) Wear Resistance

The amount of wear of tires after being driven over dry road surfaces for 10,000 km under conditions of the ordinary design load and air pressure set by the JATMA was indicated indexed to the amount of wear of the tire of Comparative Example I-1 as 100. The larger the value, the better the wear resistance.

TABLE I-1

|  | Comp. Ex. I-1 | Ex. I-1 | Ex. I-2 | Ex. I-3 | Ex. I-4 | Ex. I-5 | Ex. I-6 | Ex. I-7 |
|---|---|---|---|---|---|---|---|---|
| NR | 60 | 60 | 60 | 60 | 60 | 60 | 60 | 60 |
| BR | 40 | 40 | 40 | 40 | 40 | 40 | 40 | 40 |
| SBR | — | — | — | — | — | — | — | — |
| Carbon black I-1 | — | 60 | 55 | — | 55 | 55 | 35 | 45 |
| Carbon black I-2 | — | — | — | 55 | — | — | — | — |
| Carbon black I-3 | 55 | — | — | — | — | — | — | — |
| Carbon black I-4 | — | — | — | — | — | — | — | — |
| Carbon black I-5 | — | — | — | — | — | — | — | — |
| Carbon black I-6 | — | — | — | — | — | — | — | — |
| Carbon black I-7 | — | — | — | — | — | — | — | — |
| Silica | — | — | — | — | — | — | 20 | 10 |
| Silane coupling agent | — | — | — | — | — | — | 2 | 1 |
| Activating agent (DEG) | — | — | — | — | — | — | 1.3 | 0.7 |
| Liquid polymer | — | — | — | — | 20 | 10 | — | — |
| Aromatic oil | 20 | 25 | 20 | 20 | — | 10 | 20 | 20 |
| Zinc white | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 |
| Antioxidant | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 | 1.5 |
| Vulcanization accelerator | 1.2 | 1.2 | 1.2 | 1.2 | 1.2 | 1.2 | 1.2 | 1.2 |
| Hs (0° C.) | 56 | 56 | 56 | 56 | 57 | 56 | 56 | 56 |
| Ice skid | 100 | 101 | 100 | 100 | 100 | 101 | 103 | 101 |
| Wet skid | 100 | 106 | 105 | 104 | 106 | 106 | 109 | 107 |
| Lambourn abrasion | 100 | 118 | 117 | 122 | 120 | 118 | 113 | 115 |
| Hs aging | 100 | 100 | 101 | 101 | 111 | 107 | 101 | 101 |
| Braking on ice (new) | 100 | — | 101 | — | 101 | — | 103 | — |
| Braking on ice (driven) | 100 | — | 101 | — | 108 | — | 104 | — |
| Wear resistance | 100 | — | 119 | — | 120 | — | 114 | — |

|  | Comp. Ex. I-1 | Comp. Ex. I-2 | Comp. Ex. I-3 | Comp. Ex. I-4 | Comp. Ex. I-5 | Comp. Ex. I-6 | Comp. Ex. I-7 | Comp. Ex. I-8 | Comp. Ex. I-9 |
|---|---|---|---|---|---|---|---|---|---|
| NR | 60 | 60 | 60 | 60 | 60 | 60 | 60 | 60 | 60 |
| BR | 40 | 40 | 40 | 40 | 40 | 40 | 40 | 40 | — |
| SBR | — | — | — | — | — | — | — | 27.5 | 55 |
| Carbon black I-1 | — | — | — | — | — | 75 | 75 | 55 | 55 |
| Carbon black I-2 | — | — | — | — | — | — | — | — | — |
| Carbon black I-3 | 55 | — | — | — | — | — | — | — | — |

TABLE I-1-continued

| | | | | | | | | | |
|---|---|---|---|---|---|---|---|---|---|
| Carbon black I-4 | — | 55 | — | — | — | — | — | — | — |
| Carbon black I-5 | — | — | 55 | — | — | — | — | — | — |
| Carbon black I-6 | — | — | — | 55 | — | — | — | — | — |
| Carbon black I-7 | — | — | — | — | 55 | — | — | — | — |
| Silica | — | — | — | — | — | — | — | — | — |
| Silane coupling agent | — | — | — | — | — | — | — | — | — |
| Activating agent (DEG) | — | — | — | — | — | — | — | — | — |
| Liquid polymer | — | — | — | — | — | — | — | — | — |
| Aromatic oil | 20 | 20 | 20 | 20 | 20 | 40 | 20 | 12.5 | 5 |
| Zinc white | 3.0 | 3.0 | 3.0 | 3.0 | 3.0 | 3.0 | 3.0 | 3.0 | 3.0 |
| Stearic acid | 2.0 | 2.0 | 2.0 | 2.0 | 2.0 | 2.0 | 2.0 | 2.0 | 2.0 |
| Antioxidant | 3.0 | 3.0 | 3.0 | 3.0 | 3.0 | 3.0 | 3.0 | 3.0 | 3.0 |
| Wax | 1.0 | 1.0 | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 | 1.5 | 1.5 |
| Vulcanization accelerator | 1.2 | 1.2 | 1.2 | 1.2 | 1.2 | 1.2 | 1.2 | 1.2 | 1.2 |
| Hs (0° C.) | 56 | 56 | 56 | 56 | 56 | 56 | 65 | 61 | 63 |
| Ice skid | 100 | 100 | 100 | 100 | 100 | 100 | 86 | 96 | 89 |
| Wet skid | 100 | 98 | 99 | 93 | 89 | #08 | 107 | 107 | 108 |
| Lambourn abrasion | 100 | 98 | 94 | 86 | 74 | 102 | 115 | 108 | 103 |
| Hs aging | 100 | 101 | 100 | 100 | 100 | 88 | 101 | 100 | 100 |
| Braking on ice (new) | 100 | — | 100 | 100 | 100 | 100 | — | — | — |
| Braking on ice (driven) | 100 | — | 100 | 100 | 101 | 91 | — | — | — |
| Wear resistance | 100 | — | 94 | 86 | 73 | 102 | — | — | — |

In Table I-1, Comparative Example I-1 is a conventional formulation of a cap compound having excellent performance. With the exception of the hardness Hs (0° C.), the values of Examples are indicated indexed to the values of Comparative Example I-1 as 100.

Examples I-1 to I-5 show examples of the first aspect of the present invention. As clear from the results of Table I-1, the abrasion resistance and aging resistance have been improved, while maintaining (or improving) the ice and snow performance. In particular, Examples I-4 and I-5 have remarkable effects of improvement of the aging resistance by the blending of a liquid polymer.

On the other hand, Comparative Examples I-2 to I-9 are formulations outside the scope of the present invention. Comparative Examples I-2 to I-5 (and Comparative Example I-1) all are outside the scope of the present invention in terms of the carbon black and all do not show the desired improvement of the wear resistance. Comparative Examples I-6 and I-7 are examples of blending of the carbon black of the performance according to the provisions of the present invention but in amounts over that provided in the present invention. In Comparative Example I-6 where the amount of oil has been increased to adjust the hardness, the driving performance on ice and the aging resistance become inferior and no improvement in the wear resistance is observed. On the other hand, in Comparative Example I-7, where the hardness is not adjusted, the performance on ice deteriorates. Comparative Examples I-9 and I-10 are examples of blending of a polymer with a Tg beyond the prescribed value in Example I-2 and show a decline in the performance on ice.

As explained above, the present invention blends a specific SAF class carbon in a specific polymer system so as to improve the wear resistance and aging resistance while maintaining the ice and snow performance and achieves a high order of balance between these.

Examples II-1 to II-9 and Comparative Examples II-1 to II-11

The components shown in Table II-1 were blended in the amounts shown (parts by weight). The starting rubber and blending agents, not including the vulcanization accelerator and sulfur, were mixed in a 1.7 liter Banbury mixer for 5 minutes, then the vulcanization accelerator and sulfur were kneaded into the mixture by an 8-inch test kneading roll machine for 4 minutes to obtain the rubber compositions. The rubber compositions were pressed at 160° C. for 15 minutes for vulcanization, the necessary test pieces were prepared, the tests run, and the physical properties measured. The physical properties of the resultant vulcanizates were as shown in Table II-1. Note that the formulations in Comparative Examples II-1, II-2, II-3, II-5, and II-6 and Examples II-1, II-4, and II-8 were measured as to their braking performance on ice, wet braking performance, and wear resistance under the latter explained conditions by a test vehicle (Japanese FF sedan) equipped with pneumatic radial tires of a general structure (size: 185/70R13). The results are shown in Table II-1.

Blending agents used in Comparative Examples and Examples in Table II-1 are as follows.

NR . . . SIR-20
BR . . . Nippon Zeon "Nippol 1220"
Carbon black II-1. . . $N_2SA$=132 m$^2$/g, 24M4DBP=100 ml/100 mg
Carbon black II-2. . . $N_2SA$=111 m/g, 24M4DBP=97 ml/100 mg
Carbon black II-3. . . $N_2SA$=92 m$^2$/g, 24M4DBP=101 ml/100 mg
Silica . . . Nippon Silica Industrial "Nipsil AQ"
Silica coupling agent . . . Degussa "Si69"
Activating agent . . . ethylene glycol
Liquid polymer 1. . . liquid BR, molecular weight 15000, 1,4-cis 80%
Liquid polymer 2. . . liquid SBR, molecular weight 65000, styrene 30%
Aromatic oil . . . Kyodo Sekiyu "Process Oil X-140"
Zinc white . . . Seido Chemical Industry "Zinc White No. 3"
Stearic acid . . . Kao Corporation "Lunac YA"
Antioxidant . . . N-phenyl-N'-(1,3-dimethyl)-p-phenylenediamine (Sumitomo Chemical "Antigen 6C")
Wax . . . Ouchi Shinko Chemical Industry "Sunnoc"
Sulfur . . . oil treated sulfur
Vulcanization accelerator . . . N-tert-butyl-2-benzothiazoyl-sulfeneamide (Ouchi Shinko Chemical Industry Nocceler NS-F")

The methods of evaluation of performance shown in Table II-1 were as follows.

(1) Hs (0° C.)

The same as in Table I-1.

(2) tanδ (0° C.)

A viscodynamic spectrometer (made by Toyo Precision Machinery) was used to measure this value under conditions of a temperature of 0° C., an initial strain of 10% a dynamic strain of ±2% and a frequency of 20 Hz.

(3) Ice and Wet Skid

The same as in Table I-1.

(4) Lambourn Abrasion

The same as in Table I-1. The results were indicated indexed to Comparative Example II-1 as 100. The larger the value, the better the wear resistance.

(5) Hs Aging

The same as in Table I-1. The results were indicated indexed to Comparative Example II-1 as 100. The larger the value, the smaller the change in hardness and the better the aging.

(6) Braking on Ice (New and Driven)

The same as in Table I-1. The results were indicated indexed to Comparative Example II-1 as 100. The larger the value, the better the braking.

(7) Wet Braking Performance

The braking distance when braking after driving over an asphalt road surface sprinkled with water at an initial speed of 40 km/h was measured and indicated indexed to the value of Comparative Example II-1 as 100. The larger the value, the better the braking.

(8) Wear Resistance

The amount of wear of tires after being driven over dry road surfaces for 10,000 km under conditions of the ordinary design load and air pressure set by the JATMA was indicated indexed to the amount of wear of the tire of Comparative Example 1 as 100. The larger the value, the better the wear resistance.

(9) Method of Measurement of Properties of Carbon Black (a) Nitrogen Specific Surface Area ($N_2SA$)

According to ASTM-D3037-78 "Standard Methods of Treating Carbon Black—Surface Area by Nitrogen Adsorption" Method C.

(b) 24M4DBP Oil Absorption

According to ASTM-D-3493.

TABLE II-1

| | Comp. Ex. II-1 | Ex. II-1 | Ex. II-2 | Ex. II-3 | Ex. II-4 | Ex. II-5 | Ex. II-6 | Ex. II-7 | Ex. II-8 | Ex. II-9 |
|---|---|---|---|---|---|---|---|---|---|---|
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| Carbon black II-1 | — | 35 | 15 | 45 | 30 | 30 | 35 | 20 | 35 | 35 |
| Carbon black II-2 | — | — | — | — | — | — | — | — | — | — |
| Carbon black II-3 | 75 | — | — | — | — | — | — | — | — | — |
| Silica | — | 20 | 40 | 10 | 20 | 15 | 20 | 15 | 20 | 20 |
| Silane coupling agent | — | 2.0 | 4.0 | 1.0 | 2.0 | 1.5 | 2.0 | 1.5 | 2.0 | 2.0 |
| Activating agent | — | 1.3 | 2.7 | 0.7 | 1.3 | 1.0 | 1.3 | 1.0 | 1.3 | 1.3 |
| Liquid polymer II-1 | — | — | — | — | — | — | — | — | 20 | 10 |
| Liquid polymer II-2 | — | — | — | — | — | — | — | — | — | — |
| Aromatic oil | 40 | 20 | 20 | 20 | 20 | 10 | 30 | — | — | 10 |
| Zinc white | 3.0 | 3.0 | 3.0 | 3.0 | 3.0 | 3.0 | 3.0 | 3.0 | 3.0 | 3.0 |
| Stearic acid | 3.0 | 3.0 | 3.0 | 3.0 | 3.0 | 3.0 | 3.0 | 3.0 | 3.0 | 3.0 |
| Antioxidant | 2.0 | 2.0 | 2.0 | 2.0 | 2.0 | 2.0 | 2.0 | 2.0 | 2.0 | 2.0 |
| Wax | 1.0 | 1.0 | 1.0 | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 | 1.5 | 1.5 | 1.5 |
| Vulcanization accelerator | 1.2 | 1.2 | 1.2 | 1.2 | 1.2 | 1.2 | 1.2 | 1.2 | 1.2 | 1.2 |
| Hs (0° C.) | 56 | 56 | 56 | 56 | 53 | 56 | 51 | 55 | 57 | 56 |
| tanδ (0° C.) | 0.38 | 0.32 | 0.28 | 0.35 | 0.3 | 0.31 | 0.32 | 0.27 | 0.33 | 0.32 |
| Ice skid | 100 | 102 | 103 | 102 | 106 | 101 | 108 | 104 | 101 | 102 |
| Wet skid | 100 | 105 | 109 | 103 | 105 | 104 | 105 | 103 | 106 | 106 |
| Lambourn abrasion | 100 | 125 | 114 | 130 | 121 | 120 | 113 | 113 | 129 | 128 |
| Hs aging | 100 | 115 | 116 | 115 | 114 | 121 | 108 | 131 | 126 | 121 |
| Braking on ice (new) | 100 | 101 | — | — | 105 | — | — | — | 101 | — |
| Braking on ice (driven) | 100 | 110 | — | — | 115 | — | — | — | 119 | — |
| Wet braking performance | 100 | 104 | — | — | 105 | — | — | — | 106 | — |
| Wear resistance | 100 | 128 | — | — | 125 | — | — | — | 131 | — |

| | Comp. Ex. II-2 | Comp. Ex. II-3 | Comp. Ex. II-4 | Comp. Ex. II-5 | Comp. Ex. II-6 | Comp. Ex. II-7 | Comp. Ex. II-8 | Comp. Ex. II-9 | Comp. Ex. II-10 | Comp. Ex. II-11 |
|---|---|---|---|---|---|---|---|---|---|---|
| NR | 60 | 60 | 60 | 60 | 60 | 60 | 60 | 60 | 60 | 60 |
| BR | 40 | 40 | 40 | 40 | 40 | 40 | 40 | 40 | 40 | 40 |
| Carbon black 1 | 75 | 55 | — | — | — | — | 35 | 45 | 55 | 35 |
| Carbon black 2 | — | — | — | 35 | — | — | — | — | — | — |
| Carbon black 3 | — | — | 55 | — | 35 | — | — | — | — | — |
| Silica | — | — | — | 20 | 20 | 55 | 20 | 20 | 20 | 20 |
| Silane coupling agent | — | — | — | 2.0 | 2.0 | 5.5 | 2.0 | 2.0 | 2.0 | 2.0 |
| Activating agent | — | — | — | 1.3 | 1.3 | 3.7 | 1.3 | 1.3 | 1.3 | 1.3 |
| Liquid polymer 1 | — | — | — | — | — | — | — | — | — | — |
| Liquid polymer 2 | — | — | — | — | — | — | — | — | — | 20 |
| Aromatic oil | 40 | 20 | 20 | 20 | 20 | 20 | 40 | 20 | — | — |
| Zinc white | 3.0 | 3.0 | 3.0 | 3.0 | 3.0 | 3.0 | 3.0 | 3.0 | 3.0 | 3.0 |
| Stearic acid | 3.0 | 3.0 | 3.0 | 3.0 | 3.0 | 3.0 | 3.0 | 3.0 | 3.0 | 3.0 |
| Antioxidant | 2.0 | 2.0 | 2.0 | 2.0 | 2.0 | 2.0 | 2.0 | 2.0 | 2.0 | 2.0 |

TABLE II-1-continued

| | | | | | | | | | | |
|---|---|---|---|---|---|---|---|---|---|---|
| Wax | 1.0 | 1.0 | 1.0 | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 | 1.5 | 1.5 | 1.5 |
| Vulcanization accelerator | 1.2 | 1.2 | 1.2 | 1.2 | 1.2 | 1.2 | 1.2 | 1.2 | 1.2 | 1.2 |
| Hs (0° C.) | 56 | 56 | 56 | 56 | 56 | 57 | 47 | 62 | 56 | 61 |
| tanδ (0° C.) | 0.44 | 0.36 | 0.29 | 0.29 | 0.26 | 0.22 | 0.32 | 0.33 | 0.4 | 0.34 |
| Ice skid | 100 | 100 | 100 | 102 | 102 | 103 | 107 | 97 | 100 | 98 |
| Wet skid | 101 | 95 | 91 | 100 | 99 | 110 | 106 | 104 | 103 | 105 |
| Lambourn abrasion | 130 | 131 | 95 | 103 | 92 | 94 | 99 | 129 | 119 | 123 |
| Hs aging | 100 | 114 | 114 | 115 | 115 | 115 | 100 | 116 | 100 | 127 |
| Braking on ice (new) | 100 | 100 | — | 101 | 102 | — | — | — | — | — |
| Braking on ice (driven) | 99 | 115 | — | 109 | 110 | — | — | — | — | — |
| Wet braking performance | 102 | 94 | — | 100 | 99 | — | — | — | — | — |
| Wear resistance | 129 | 130 | — | 102 | 89 | — | — | — | — | — |

As shown in Table II-1, the examples and comparative examples were evaluated using as a reference Comparative Example II-1, which is a typical example of a conventional cap compound. Examples II-1 to II-7 show examples of the present invention. As shown in Table II-1, compared with Comparative Example II-1, they have at least equal braking performance on ice and improved performances of wet skid, Lambourn hardness, and Hs aging. Examples II-8 and II-9 are modifications of Example II-1 with all or part of the oil replaced by a liquid polymer and are further improved in aging.

Contrary to this, Comparative Examples II-2 to II-4 were systems out of the scope of the present invention with no silica added. As shown in Table II-1, the effect of improvement of the wet skid was either small or the performance fell. Further, Comparative Examples II-5 and 6 were examples of blending of amounts of carbon black out of the scope of the invention as in Example II-1. As shown in Table II-1, no improvement in the wet performance was recognized and the wear resistance was low as well. Comparative Example II-7 is a system with no carbon black blended in and is inferior in wear resistance. Comparative Example II-8 has too much softener blended in, so is inferior in wear resistance and aging. Comparative Example II-9 has too much carbon black and silica blended in, so is high in Hs and inferior in performance on ice. Comparative Example II-10 has too much of a total of carbon black and silica and a softener blended in, so shows no improvement in the aging. Comparative Example II-11 is the system of Example II-8 plus a liquid polymer out of the scope of the invention, so the Hs becomes high and the performance on ice becomes inferior.

As shown by the Examples, according to the second aspect of the present invention, by using a rubber composition obtained by blending a specific carbon black/silica system into a specific polymer system, it is possible to obtain a pneumatic tire with an excellent wear resistance, wet performance, and aging while maintaining the ice and snow performance.

We claim:

1. A pneumatic tire for running on ice and snow in which a cap tread portion is composed of a rubber composition comprising:

(A) 100 parts by weight of a rubber component mainly comprising natural rubber and polybutadiene rubber and having a hardness at 0° C. of not more than 60 based on JIS-K-6301;

(B) (i) carbon black having a nitrogen specific surface area ($N_2SA$) of not less than 120 m²/g and a 24M4DBP of not less than 90 ml/100 g and (ii) silica in an amount of from 5 to 40 parts by weight per 100 parts by weight of the rubber component, wherein the total weight of the carbon black and silica is not more than 60 parts by weight per 100 parts by weight of the rubber component; and (C) a low molecular weight diene liquid polymer having a molecular weight of not more than 60,000.

2. The pneumatic tire of claim 1, further comprising a softener in a ratio of (parts by weight softener)/(parts by weight silica+parts by weight carbon black) of not more than 0.7.

3. The pneumatic tire of claim 2, wherein the ratio is from 0.05 to 0.5.

4. The pneumatic tire of claim 1, wherein said carbon black has an $N_2SA$ of from 120 to 200 m²/g and a 24M4DBP of from 90 to 130 ml/100 g.

5. The pneumatic tire of claim 1, wherein the silica is present in an amount of from 10 to 30 parts by weight per 100 parts by weight of the rubber component.

6. The pneumatic tire of claim 1, wherein the total weight of the carbon black and silica is from 35 to 60 parts by weight per 100 parts by weight of the rubber component.

* * * * *